Sept. 13, 1927.　　　V. F. DIAZ　　　1,642,062

DEVICE FOR MAKING WAFFLES

Filed Sept. 9, 1925

INVENTOR
Vicente F. Diaz
BY
ATTORNEY

Patented Sept. 13, 1927.

1,642,062

UNITED STATES PATENT OFFICE.

VICENTE F. DIAZ, OF LOWELL, ARIZONA.

DEVICE FOR MAKING WAFFLES.

Application filed September 9, 1925. Serial No. 55,226.

This invention relates to improvements in waffle-irons, and it is the principal object of the invention to provide an apparatus for rolling the dough, pressing or forming and heating or baking the same to make waffles, pancakes, or the like bake ware.

Another object of the invention is the provision of a waffle-iron combining a hand operated roller for flattening the dough with a spring-controlled presser and a heater or baker.

A further object of the invention is the provision of an apparatus of this character allowing a rolling of the dough, pressing or forming and heating of the same in one operation in an efficient manner.

A still further object of the invention is the provision of an apparatus of this character including a handle for manipulating a dough roller, and a spring-controlled hand-lever for operating the former in an efficient manner.

These and other objects and advantages of my invention will become more fully apparent as the description thereof proceeds, and will then be more specifically defined in the appended claims.

In the accompanying drawing forming a material part of this disclosure:

Figure 1:
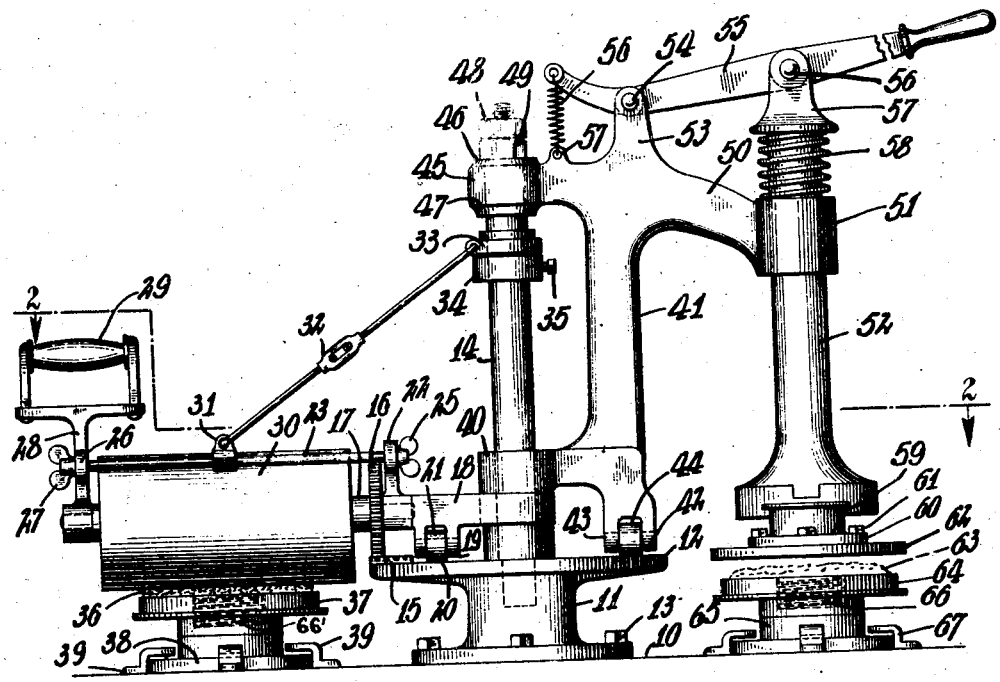
Fig. 1 is a side elevation of a pan-cake or waffle-iron constructed according to the present invention.
Figure 2:
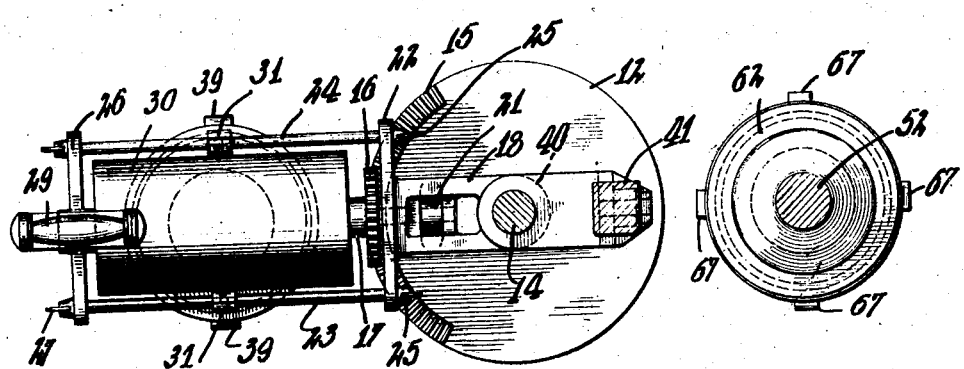
Fig. 2 is a section on line 2—2 of Figure 1.

A base or support 10 has attached thereto the flanged foot 11 of a table 12 by means of bolts 13, or the like, passed through the foot flange. This table carries a vertical standard or post 14, and has on part of its upper face a segmentary rack 15 formed therewith with which engages a gear 16 on a shaft 17 secured to a bracket 18, the looped end of which allows the passage of pin 14 and a turning about the same. The bracket has depending lugs 19 and 20 between which a roller 21 is journaled.

The upper face of bracket 18 carries an upright flange 22 having perforated ends for the passage of rods 23 and 24, the projecting ends of which have wing nuts 25 attached thereto. The opposite ends of these rods are passed through perforations near the ends of a bracket 26, where they carry fastening means, such as wing nuts 27. The bracket 26 has a lower extension in which one end of shaft 17 is journaled, and an upper extension 28, the upper end of which is formed into a handle 29.

A roller 30 is mounted on shaft 17 between the rods 23 and 24, and eyes 31 attached to these rods have secured therein one end of a turn-buckle arrangement 32, the opposite end of which is attached to a collar 33 rotating about post 14, and held in position thereon by means of a collar 34 and set-screw 35.

The dough 36 is placed on a heater 66' in table 37 beneath the roller 30 secured with the flange of its foot 38 to support 10 by means of Z-irons 39, or the like.

On the standard or post 14, is rotatably held the looped branch 40 of a member 41 having its lower end formed with depending lugs 42 and 43 between which a roller 44 is journaled, adapted to roll over table 12 on the arc of a circle.

The upper end of member 41 has one of its branches formed into a socket or loop 45 held and guided between washers or discs 46 and 47, on post 41 and held in position thereon by means of counter nuts 48 and 49. The member 41 has also another branch 50 formed therewith ending into a loop 51 through which a post 52 loosely extends.

Projections or cheeks 53 of the member have a pin 54 secured thereto on which a lever 55 is pivotally secured intermediate its ends, having a curved perforated rear end in the perforation of which one end of a spring 56 is secured, the lower end of which is attached to an eye 57 of the member 41.

Near its outer end, the lever is pivotally attached as at 56, to an element 57 in the upper end of post 52, and a spring 58 is wound about said post between the lower end of element 57 and loop 51. The lower, outwardly flaring end of post 52 has exchangeably secured thereto the boss 59 to the lower flange 60 of which is attached by means of bolts 61, or the like, a presser plate 62 adapted to press the dough 63 into a waffle or pancake form 64 having its foot 65, enclosing a suitable heater 66 attached to support 10 by means of a plurality of Z-irons 67 gripping over the flange of the foot 65.

The device operates as follows:

The dough is placed onto table 37 which has upstanding flanges and rolled thereon by the manipulation of roller 30 by means of handle 29 in an evident manner, the heater 66' being turned off, then it is brought into the form 64 which has also an upstanding flange, while the post 52 and parts connected thereto are swung aside to allow the convenient placing of the dough into its form.

Then the post 52 is swung back to a position in which its presser plate is above the form and post and plate are depressed to form the dough which is then heated or baked by any suitable source of heat 66 concealed in the foot of the former. When it is desired to make plain waffles, the heater 66' is turned on to do the cooking, and the presser and heater 66 are not used.

It will be understood, that while I have shown and described the preferred form of my apparatus as an example, such changes may be made in the general arrangement and construction thereof, as fall within the scope of the appended claims without departure from the spirit of the invention and the principle involved.

Having thus described my invention, what I claim as new, and desire to secure by Letters Patent, is:

1. In a device of the class described, the combination of a table having a rack formed on its upper face, a central post secured to said table, a member rotatable on said post, a horizontal shaft projecting from said member, a roller on said shaft, a gear meshing with said rack and fixed to said shaft, a frame supported from said member and shaft, a handle for manipulating said roller, said handle being secured to said frame, and a roller secured to said member, rolling on said table to support said shaft and roller.

2. In a device of the class described, the combination of a table having a rack formed on its upper face, a central post secured to said table, a member rotatable on said post, a horizontal shaft projecting from said member, a roller on said shaft, a gear meshing with said rack and fixed to said shaft, a frame supported from said member and shaft, a handle for manipulating said roller, said handle being secured to said frame, a rotatable collar on said post, a turn-buckle arrangement between said collar and frame, and a roller secured to said member, rolling on said table to support said shaft and roller.

3. In a device of the class described, the combination of a table having a rack formed on its upper face, a central post secured to said table, a member rotatable on said post, a horizontal shaft projecting from said member, a roller on said shaft, a gear meshing with said rack and fixed to said shaft, a frame supported from said member and shaft, a handle for manipulating said roller, said handle being secured to said frame, a rotatable collar on said post, a turn-buckle arrangement between said collar and frame, and a roller secured to said member, rolling on said table to support said shaft and roller, and a dough holder with a heater beneath said first mentioned roller.

In testimony whereof I have affixed my signature.

VICENTE F. DIAZ.